(12) United States Patent
Hudgins et al.

(10) Patent No.: US 9,474,410 B2
(45) Date of Patent: Oct. 25, 2016

(54) KITCHEN APPLIANCE AND METHOD OF USING SAME

(71) Applicant: Hamilton Beach Brands, Inc., Glen Allen, VA (US)

(72) Inventors: Arthur W Hudgins, Henrico, VA (US); Mark C Steiner, Midlothian, VA (US); Ernest B. Pryor, Jr., Maidens, VA (US); Martin Brady, Manakin Sabot, VA (US); Yvonne Olson, Richmond, VA (US); Alexander D Raring, Midlothian, VA (US); Guoyao Ye, Glen Allen, VA (US); John D. Barnes, Richmond, VA (US); Michael G Sandford, Mechanicsville, VA (US); George Stamper, Quinton, VA (US); Patrick T Mulvaney, Richmond, VA (US); Michael Garman, Moseley, VA (US)

(73) Assignee: Hamilton Beach Brands, Inc, Glen Allen, VA (US)

( * ) Notice: Subject to any disclaimer, the term of this patent is extended or adjusted under 35 U.S.C. 154(b) by 245 days.

(21) Appl. No.: 14/059,879

(22) Filed: Oct. 22, 2013

(65) Prior Publication Data

US 2014/0116260 A1    May 1, 2014

Related U.S. Application Data

(60) Provisional application No. 61/718,351, filed on Oct. 25, 2012.

(51) Int. Cl.
*A47J 27/08*    (2006.01)
*H05B 6/12*    (2006.01)

(Continued)

(52) U.S. Cl.
CPC .............. *A47J 36/10* (2013.01); *A47J 27/004* (2013.01)

(58) Field of Classification Search
CPC ...... A47J 27/00; A47J 27/08; A47J 27/0804; A47J 27/0813; H05B 6/12
USPC ......... 99/324, 467, 331, 339, 340, 403, 426, 99/337, 413; 219/725, 621, 734, 400, 401; 16/110.1, 431, 221; 220/573.1, 23.83, 220/694
See application file for complete search history.

(56) References Cited

U.S. PATENT DOCUMENTS

RE3,080 E    8/1868 Squire
148,130 A    3/1874 Moore
(Continued)

FOREIGN PATENT DOCUMENTS

EP    0168985    1/1986

OTHER PUBLICATIONS

Toastmaster, Cookin' in Style, Portable Slow Cooker, 2004, 2 pages.

(Continued)

*Primary Examiner* — David Angwin
*Assistant Examiner* — Michael Laflame, Jr.
(74) *Attorney, Agent, or Firm* — Alexander D. Raring

(57) ABSTRACT

A kitchen appliance includes a housing that defines a cavity. The housing has a housing rim defining an opening to the cavity. A heating or cooling element is disposed within the housing to heat or cool the cavity. A container has a generally hollow interior and a container rim. A lid is sized and shaped to at least partially cover the opening of the container when placed on the container. The lid has an exterior surface and an opposing interior surface. At least one latching mechanism or handle is operable to seal the contents of the appliance within the appliance.

6 Claims, 11 Drawing Sheets

(51) Int. Cl.
*A47J 36/10* (2006.01)
*A47J 27/00* (2006.01)

(56) References Cited

U.S. PATENT DOCUMENTS

| | | | |
|---|---|---|---|
| 192,453 A | 6/1877 | Purdy | |
| 223,013 A | 12/1879 | Shirley et al. | |
| 323,101 A | 7/1885 | Bard | |
| 398,539 A | 2/1889 | Rock | |
| 466,648 A | 1/1892 | Young | |
| 862,908 A | 8/1907 | Hawkinson | |
| 899,084 A | 9/1908 | Thoits et al. | |
| 951,916 A | 3/1910 | Leighty | |
| 961,963 A | 6/1910 | Hughes | |
| 1,065,667 A | 6/1913 | Donnell | |
| 1,084,817 A | 1/1914 | Parkinson | |
| 1,204,715 A | 11/1916 | Taylor | |
| 1,207,974 A | 12/1916 | Miller | |
| 1,232,385 A | 7/1917 | Palmer | |
| 1,271,230 A | 7/1918 | Sabo | |
| 1,300,712 A | 4/1919 | Ferdon | |
| 1,336,491 A | 4/1920 | Stern | |
| 1,367,739 A | 2/1921 | Hibbard | |
| 1,410,515 A | 3/1922 | Saddlemire | |
| 1,438,706 A | 12/1922 | Hegenberg | |
| 1,451,545 A | 4/1923 | Ingersoll | |
| 1,483,255 A | 2/1924 | Tonge | |
| 1,513,581 A | 3/1924 | Caumont | |
| 1,531,772 A | 3/1925 | Wentorf et al. | |
| 1,698,928 A | 1/1929 | Wentorf et al. | |
| RE17,398 E | 8/1929 | Kircher | |
| 1,765,135 A | 6/1930 | Doland | |
| 1,771,294 A | 7/1930 | Hackett | |
| 1,802,557 A | 4/1931 | Hight | |
| 2,223,432 A | 12/1940 | Smith | |
| D129,108 S | 8/1941 | Sprague | |
| 2,526,050 A | 10/1950 | Schweiso | |
| 2,636,639 A | 4/1953 | Frey | |
| 2,817,552 A | 12/1957 | Bruel | |
| 2,846,257 A | 8/1958 | Sherrill | |
| 2,974,990 A | 3/1961 | Mereness | |
| 3,124,381 A | 3/1964 | Geldart | |
| 3,133,665 A | 5/1964 | Colhouer | |
| 3,140,795 A | 7/1964 | Griffith et al. | |
| 3,174,787 A | 3/1965 | Kolman | |
| 3,291,515 A | 12/1966 | Lierman | |
| 3,363,924 A | 1/1968 | Remig | |
| 3,577,908 A | 5/1971 | Burg | |
| 3,589,760 A | 6/1971 | Williams | |
| 3,635,371 A | 1/1972 | Oxel | |
| 3,674,298 A | 7/1972 | Vekony | |
| 3,746,205 A | 7/1973 | Helguera | |
| 3,746,837 A | 7/1973 | Frey et al. | |
| 3,769,899 A | 11/1973 | Kostko | |
| 3,769,902 A * | 11/1973 | Hurwitz | A47J 27/086 219/401 |
| 3,791,368 A | 2/1974 | Hunt | |
| 4,095,830 A | 6/1978 | Spellman | |
| 4,241,846 A | 12/1980 | Murphy | |
| 4,307,287 A | 12/1981 | Weiss | |
| 4,375,711 A | 3/1983 | Franzen et al. | |
| 4,492,853 A | 1/1985 | Lam | |
| 4,545,501 A | 10/1985 | DeFord | |
| 4,581,989 A * | 4/1986 | Swartley | A23L 1/0107 126/21 A |
| D298,899 S | 12/1988 | Blum et al. | |
| D307,531 S | 5/1990 | Ishida | |
| D313,727 S | 1/1991 | Gamez | |
| 5,046,633 A | 9/1991 | Chung | |
| 5,097,107 A | 3/1992 | Watkins et al. | |
| 5,129,314 A | 7/1992 | Hu | |
| D338,370 S | 8/1993 | Takeda | |
| 5,251,542 A | 10/1993 | Itoh et al. | |
| D341,058 S | 11/1993 | Slany et al. | |
| 5,337,910 A | 8/1994 | Picozza et al. | |
| 5,355,777 A | 10/1994 | Chen et al. | |
| 5,415,082 A | 5/1995 | Nagao | |
| 5,447,252 A | 9/1995 | Ward | |
| D368,620 S | 4/1996 | Piret | |
| D370,826 S | 6/1996 | Thurlow | |
| 5,567,458 A | 10/1996 | Wu | |
| 5,643,481 A | 7/1997 | Brotzki et al. | |
| 5,678,790 A | 10/1997 | Dwyer | |
| 5,687,879 A | 11/1997 | King et al. | |
| D388,657 S | 1/1998 | Bacharowski | |
| 5,715,570 A | 2/1998 | Hyun | |
| 5,786,568 A | 7/1998 | McKinney | |
| 5,829,342 A | 11/1998 | Lee | |
| 5,945,024 A | 8/1999 | Fukunaga et al. | |
| 6,062,130 A | 5/2000 | Brady | |
| 6,102,238 A | 8/2000 | Brady et al. | |
| 6,109,169 A | 8/2000 | Masel et al. | |
| 6,237,765 B1 | 5/2001 | Hagen et al. | |
| 6,587,739 B1 | 7/2003 | Abrams | |
| 6,606,987 B2 | 8/2003 | DeMars | |
| 6,772,677 B2 | 8/2004 | Marotel et al. | |
| 6,776,085 B1 | 8/2004 | Tang | |
| D528,353 S | 9/2006 | Brady et al. | |
| 7,140,506 B1 | 11/2006 | Brady et al. | |
| 7,167,642 B1 | 1/2007 | Wagner | |
| 7,485,831 B2 | 2/2009 | Tynes et al. | |
| 7,706,671 B2 | 4/2010 | Brown | |
| 7,717,028 B2 | 5/2010 | Serra | |
| 7,947,928 B2 | 5/2011 | Tynes et al. | |
| D642,856 S | 8/2011 | Bock et al. | |
| D649,831 S | 12/2011 | Romandy | |
| 8,109,201 B2 | 2/2012 | Schandel et al. | |
| D657,611 S | 4/2012 | Bock | |
| 2002/0073851 A1 | 6/2002 | Chung et al. | |
| 2003/0234205 A1 | 12/2003 | McGuyer et al. | |
| 2005/0145615 A1 * | 7/2005 | Schaffeld | A47J 45/065 219/440 |
| 2007/0295221 A1 * | 12/2007 | Seurat Guiochet | A47J 27/0813 99/337 |
| 2008/0084144 A1 | 4/2008 | D'Ambrosio | |
| 2008/0290092 A1 * | 11/2008 | de Bastos Reis Portugal | A47J 27/0813 220/321 |
| 2009/0039071 A1 | 2/2009 | Tynes et al. | |
| 2009/0158940 A1 * | 6/2009 | Archer | A47J 39/006 99/403 |
| 2009/0218355 A1 | 9/2009 | Chameroy et al. | |
| 2009/0272279 A1 | 11/2009 | Kieck | |
| 2010/0059460 A1 | 3/2010 | Mulaw | |
| 2010/0251902 A1 * | 10/2010 | Schandel | A47J 27/004 99/348 |
| 2011/0061545 A1 | 3/2011 | Foster et al. | |

OTHER PUBLICATIONS

Brian Krepshaw, Back to Work Gets Tastier, Crock-Pot SCCPLC2w00-G Lunch Crock Food Warmer, Jan. 3, 2012, 2 pages.
Ella Grace, Inc., SecureLid™ Product Description and Key Features, 2004, 2 pages.

* cited by examiner

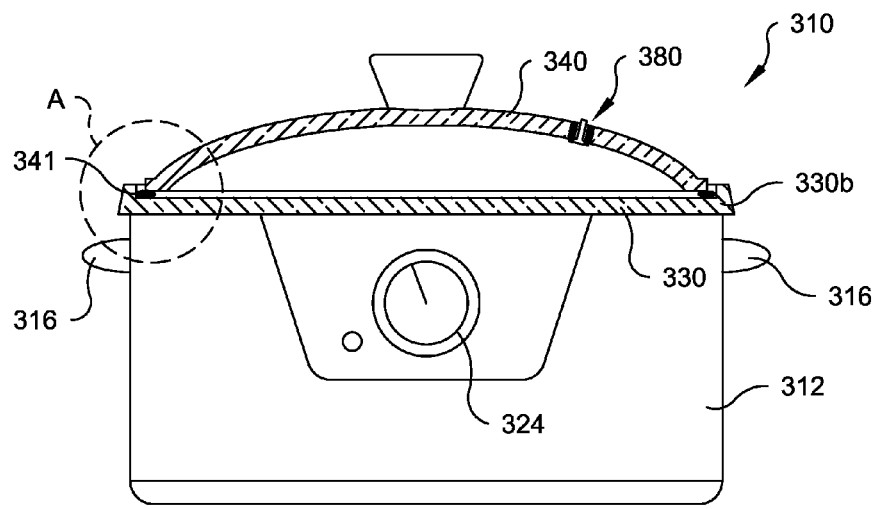
Fig. 5
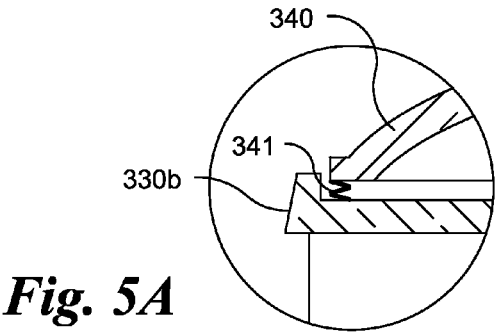
Fig. 5A
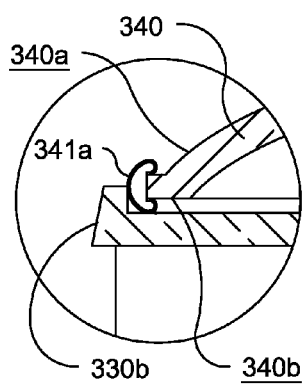 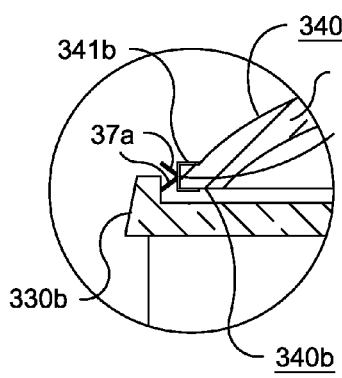 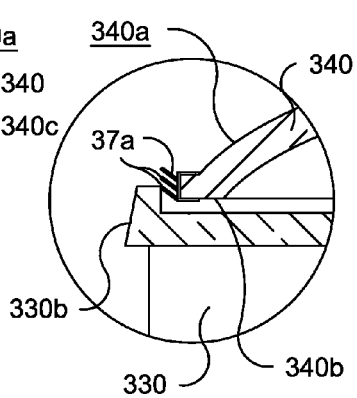
Fig. 6     Fig. 7     Fig. 8

KITCHEN APPLIANCE AND METHOD OF USING SAME

BACKGROUND OF THE DISCLOSURE

The present disclosure relates generally to a kitchen appliance and, more particularly, to a slow cooker that can be easily transported with little or no spillage of contents therein.

Kitchen appliances, and particularly slow cookers, are well known. Conventional slow cookers are generally sized and shaped to allow a user to pick-up and move or transport the slow cooker from one location to another. Often, the user may want to move the slow cooker after it is loaded with contents, such as foodstuff to be cooked and/or other contents to be heated.

However, it can be difficult to move or transport conventional slow cookers when foodstuff, particularly liquid, has been placed therein without spilling some of the foodstuff. The components of conventional slow cookers are not made to close tolerances, and any lid of a conventional slow cooker is typically not securely engaged with a container of the slow cooker when in a closed position. This creates a potential for the lid to inadvertently slide off the container when the slow cooker is being transported from one location to another. Also, because the lid is not usually engaged with a tight fit and because foodstuff typically cooked in a slow cooker, such as soup, chili, stew, etc., typically has a significant liquid content, there exists the potential of significant spillage if the slow cooker is tilted during transport.

The device of the following disclosure overcomes and/or eliminates at least one of the above or other shortcomings of such conventional appliances.

BRIEF SUMMARY OF THE DISCLOSURE

Briefly stated, a embodiment of the present disclosure is directed to a kitchen appliance having a housing with a base and a side wall extending therefrom. The side wall has an exterior surface and an opposing interior surface. At least portions of the interior surface of the side wall and base define a cavity within the housing. The housing has a housing rim at a first, free edge of the side wall defining an opening to the cavity. A heating or cooling element is disposed within the housing proximate the cavity to heat or cool the cavity. A container has a generally hollow interior and a container rim defining an opening for accessing the interior thereof. The interior of the container is capable of retaining contents therein. The container is sized and shaped to fit within the cavity of the housing. A lid is sized and shaped to at least partially cover the opening of the container when placed on the container. The lid has an exterior surface and an opposing interior surface facing the interior of the container when the lid is placed on the container. At least one latching mechanism is mounted to one of the exterior surface of the side wall of the housing and the exterior surface of the lid.

BRIEF DESCRIPTION OF THE SEVERAL VIEWS OF THE DRAWINGS

The foregoing summary, as well as the following detailed description of the disclosure, will be better understood when read in conjunction with the appended drawings. For the purpose of illustrating the disclosure, there are shown in the drawings embodiments which are presently preferred. It should be understood, however, that the disclosure is not limited to the precise arrangements and instrumentalities shown. In the drawings:

FIG. 5 is a partial cross-sectional side elevational view of a kitchen appliance according to a fourth embodiment of the present disclosure, wherein the lid is in the engaged position;

FIG. 5A is an enlarged partial cross-sectional side elevational view of the kitchen appliance of FIG. 5, taken from within the dashed circle A of FIG. 5;

FIG. 6 is an enlarged partial cross-sectional side elevational view of the kitchen appliance of FIG. 5 according to a modified embodiment, taken from within the dashed circle A of FIG. 5;

FIG. 7 is an enlarged partial cross-sectional side elevational view of the kitchen appliance of FIG. 5 according to another modified embodiment, taken from within the dashed circle A of FIG. 5;

FIG. 8 is an enlarged partial cross-sectional side elevational view of the kitchen appliance of FIG. 5 according to a further modified embodiment, taken from within the dashed circle A of FIG. 5;

DETAILED DESCRIPTION OF THE DISCLOSURE

Figure 1:
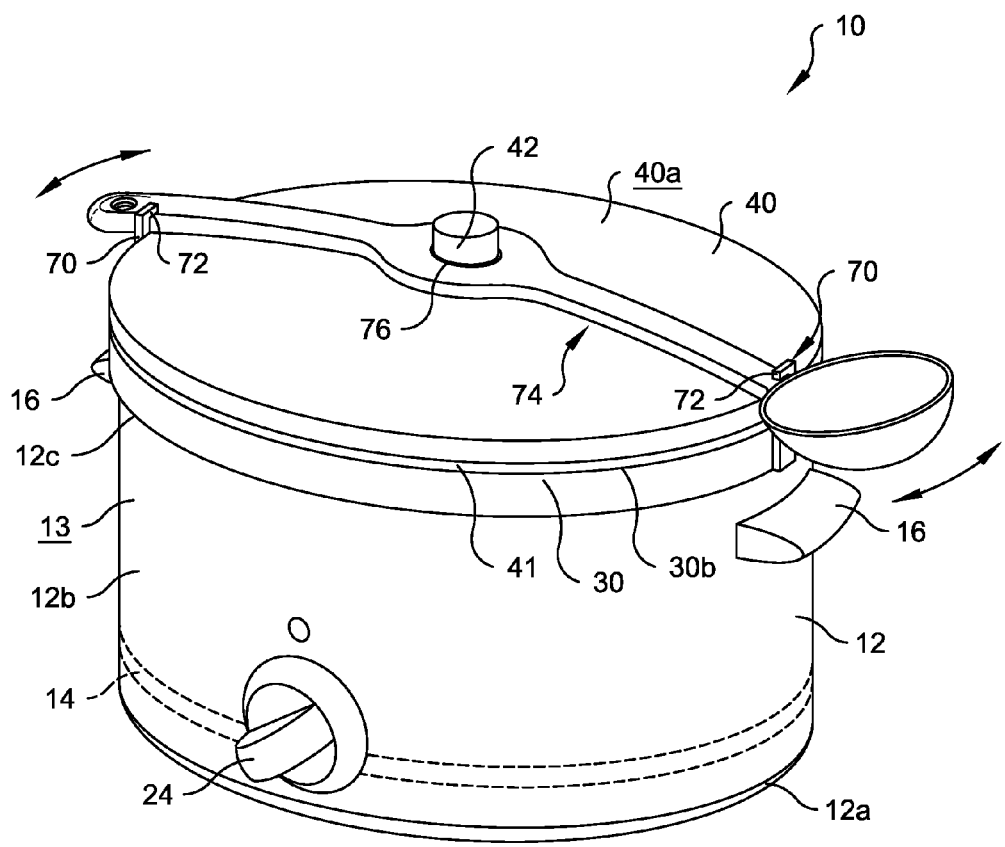
FIG. 1 is a top front perspective view of a kitchen appliance according to a first embodiment of the present disclosure, wherein a lid is in an engaged position.

Certain terminology is used in the following description for convenience only and is not limiting. The words "lower," "bottom," "upper" and "top" designate directions in the drawings to which reference is made. The words "inwardly," "outwardly," "upwardly" and "downwardly" refer to directions toward and away from, respectively, the geometric center of the kitchen appliance, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

Referring to the drawings in detail, wherein like numerals indicate like elements throughout, FIG. 1 is a top perspective view of a kitchen appliance, generally designated 10, according to a first embodiment of the present disclosure. The kitchen appliance 10 is illustrated as a slow cooker for warming and/or cooking (collectively referred to as heating) contents (none shown), such as foodstuff or another object, therein. However, the present disclosure is not limited to such a device or functionality. For example, the kitchen appliance 10 may be any of a variety of devices typically used in a kitchen, such as a deep fryer, roaster oven, or the like. In fact, the kitchen appliance 10 could be any type of device having a lid and a container/housing, as described in detail below. The term "foodstuff," as used herein, is sufficiently broad to cover any substance that is capable of being consumed by a user, such as a pork roast, soup, vegetables, water, milk or the like, or any combination thereof. The kitchen appliance 10 is also capable of heating or cooling one or more objects (not shown) other than foodstuff, such as a baby's bottle, one or more stones or towels for a massage, or the like.

Referring to FIG. 1, the kitchen appliance 10 includes a housing 12 having a base 12*a* and a side wall 12*b* extending therefrom. The side wall 12*b* preferably extends generally perpendicularly to the base 12*a*, although other geometries are suitable. The side wall 12*b* includes an exterior surface 13 that faces and/or is exposed to the external environment and an opposing interior surface (not shown). At least portions of the interior surface of the side wall 12*b* and an interior or upper surface (not shown) of the base 12*a* surround and/or define a cavity (not shown) of the housing 12. At least one and preferably two spaced-apart handles 16 extend laterally outwardly from the exterior surface 13 of the side wall 12*b*. The housing 12 also includes a housing rim 12*c* at an upper free edge of the side wall 12*b*. The housing rim 12*c* surrounds and/or defines an opening to the cavity of the housing 12.

Preferably, the base 12*a*, the side wall 12*b* and the housing rim 12*c* are generally ovular or elliptical in shape when viewed from above or below. Thus, the housing 12 preferably has a major axis (not shown) and a minor axis (not shown). The minor axis extends at least generally, and preferably exactly, perpendicularly to the major axis. While the ovular or elliptical shape is preferred, the base 12*a* may have a different shape, such as, but not limited to, circular or rectangular in plan view. The base 12*a* may include several generally spaced-apart, rounded protrusions or feet (not shown) extending downwardly from a bottom surface thereof for supporting the kitchen appliance 10 on a support surface (not shown), such as a countertop, and spacing the bottom surface of the base 12*a* at least slightly above the support surface. Alternatively, the kitchen appliance 10 may include no feet, such that the kitchen appliance 10 is supported by the bottom surface of the base 12*a* directly on the support surface.

A heating or cooling element 14 (shown in phantom) is preferably disposed within the housing 12 proximate the cavity to heat and/or cool the cavity. The heating or cooling element 14 may be located within or on the interior surface of the side wall 12*b* of the housing 12, or may be disposed within the base 12*a* of the housing 12 in addition to or instead of the side wall 12*b*. The heating or cooling element 14 may be electrically powered and is preferably a resistance-type heating element, such as a calrod or mica board heating element. However, a different type of heating or cooling element may be used, provided the heating or cooling element functions to heat and/or cool the cavity of the housing 12.

A control knob 24 preferably extends laterally outwardly from the side wall 12*b* of the housing 12 to enable a user to control the heating or cooling element 14. Thus, the control knob 24 is preferably operatively connected to the heating or cooling element 14. It is preferred that rotation of the knob 24 by a user toggles the heating or cooling element 14 between at least one "on" setting and an "off" setting. It is further preferred that the heating or cooling element 14 has at least two "on" settings, specifically a "high" heat setting and a "low" heat setting. Although at least two heat settings are preferred, it is further contemplated that alternate configurations may be used, such as, but not limited to, rotation of the knob 24 actuating a thermostat (not shown) to cause the heating or cooling element 14 to heat and/or cool the cavity of the housing 12 to a specific user selected temperature within a temperature range or scale. The kitchen appliance 10 is not limited to the size, shape, configuration and/or functionality of the control knob 24 shown and described herein. Instead, the kitchen appliance 10 may have a control interface (not shown), with one or more buttons, switches or the like, in addition to or in place of the control knob 24.

The kitchen appliance 10 preferably includes a container 30 sized and/or shaped to fit within the cavity of the housing 12 for heating and/or cooling thereof by the heating or cooling element 14. More specifically, an exterior of the container 30 is preferably at least slightly smaller than the interior of the cavity of the housing 12, such that at least a majority of the container 30 fits within the cavity of the housing 12. The container 30 is preferably made of stoneware or ceramic. However, the container 30 may be made of a different material, such as cast iron with a porcelain enamel coating, for instance, provided the container 30 is capable of functioning as described herein. Additionally, it is preferable that the container 30 be easily removable from the housing 12 to facilitate cleaning thereof without exposing the housing 12, and specifically the heating or cooling element 14 and other electrical components thereof, to water and/or cleaning detergents or solvents.

The container 30 preferably includes a generally hollow interior (not shown). A container rim 30*b* preferably defines an opening for accessing the interior of the container 30. The interior of the container 30 is capable of retaining the contents therein. The phrase "container rim," as used herein, may simply be a top or upper-most horizontal edge of a side wall of the container 30. Additionally and/or alternatively, the phrase "container rim" may be at least a portion of a ledge (not shown) spaced inwardly and at least slightly downwardly from the upper-most horizontal edge of the side wall of the container 30.

The kitchen appliance 10 preferably includes a lid 40 sized and shaped to at least partially and preferably completely cover the opening of the container 30 when the lid 40 is placed on or adjacent to the container rim 30b. The lid 40 includes a top or exterior surface 40a and an opposing bottom or interior surface (not shown) that faces the interior of the container 30 when the lid 40 is placed on or adjacent to the container rim 30b. A lid knob or handle 42 preferably extends outwardly or upwardly from the exterior surface 40a of the lid 40. The lid 40 may have at least a slightly arcuate shape, such that the exterior surface 40a is generally convex and the interior surface is generally concave. Alternatively, at least one or both of the exterior surface 40a and the interior surface of the lid 40 may be at least partially or entirely flat. The lid 40 may be predominantly made of glass, although the lid 40 may be made of a different, preferably transparent or translucent material, such as a polymeric material, for instance, provided the lid 40 functions as described herein.

The lid 40 is preferably generally ovular or elliptical when viewed from above or below to correspond to or at least generally match the shape of the opening of the container 30. Preferably, when placed on the container rim 30b, the lid 40 covers the entire opening of the container 30 such that an entire outer periphery of the lid 40 engages and/or is placed adjacent to the container rim 30b. The lid 40 may have an outer periphery and a diameter that is at least slightly smaller than an outer periphery and a diameter of the container rim 30b, such that at least a portion of the outer periphery of the lid 40 rests on the ledge at least slightly inwardly from the outer periphery of the container 30. However, in the first embodiment, the outer periphery of the lid 40 may match or be about the same size as or slightly smaller than the outer periphery of the container 30.

A gasket 41 preferably extends around and/or below one of the outer periphery or edge of the lid 40 and the container rim 30b for sealing the lid 40 to the container 30. More specifically, when the lid 40 is removed from the container 30, the gasket 41 may extend around and/or be attached to the outer edge or periphery of the lid 40 or the interior surface of the lid 40 proximate the outer edge thereof. Alternatively, the gasket 41 may extend around and/or be attached to the container rim 30b. The gasket 41 is preferably formed of a resiliently flexible material, such as an elastomeric or rubber material. The gasket 41 may be identical to that disclosed in U.S. Pat. No. 7,947,928, which is herein incorporated by reference in its entirety. However, instead of a circular or ovular cross-sectional shape, the gasket 41 may has a Z or zig-zag shape. Regardless of the cross-sectional shape of the gasket 41, the gasket 41 is preferably at least slightly compressible to create at least a generally liquid-tight seal between the lid 40 and the container rim 30b when the lid 40 is properly placed on the container 30 and the lid 40 is placed in an engaged position, as described in detail below.

It is preferred that at least one and more preferably two equidistantly spaced-apart latches 70 are attached to one of the housing 12 and the container 30. More specifically, at least a portion of each latch 70 is fixedly attached to at least a portion of the container rim 30b. Alternatively, each latch 70 may be rotatable with respect to the container 30, such that each latch 70 can rotate into and out of an engaged position (see FIG. 1). An upper portion of each latch 70 that is preferably capable of extending above the container rim 30b preferably includes a hook 72. Each hook 72 defines a slot or groove therein. The hook 72 of one of the latches 70 preferably extends in an opposite direction to the hook 72 of the other latch 70.

The kitchen appliance 10 preferably includes a latching or elongated member 74, such as a spoon or other utensil. The elongated member 74 is preferably removably attached to at least one of the lid 40, the container 30 and the housing 12. A length of the elongated member 74 is preferably greater than the major axis of the housing 12, such that at least opposing end portions of the elongated member 74 extend laterally outwardly beyond an outer periphery of the lid 40, the container 30 and the housing 12. The elongated member 74 preferably includes a central opening 76 that preferably has an internal diameter that is at least slightly larger than an exterior diameter of the lid knob 42, such that at least a portion of the lid knob 42 can fit within the central opening 76 as shown. When the lid knob 42 is positioned within the central opening 76 of the elongated member 74, opposing end portions of the elongated member 74 preferably extend outwardly beyond an outer periphery of the lid 40, the container 30 and the housing 12. The elongated member 74 is preferably formed of a light-weight, high-strength material, such as a polymeric or metallic material.

The elongated member 74 is positionable on the lid 40 such that the lid 40 has an engaged position (FIG. 1). In the engaged position, it is preferred that foodstuff is generally prevented from leaking outside of the container 30 and/or the housing 12. The elongated member 74 may be rotated (e.g., clockwise) from the position shown in FIG. 1 such that the elongated member 74 may be removed from the lid 40, thereby placing the lid in a disengaged position (not shown in the first embodiment, but see the later embodiments). In the engaged position, it is preferred that at least a portion of the elongated member 74 is positioned within at least a portion of the hook 72 of each latch 70 to retain the lid 40 in sealing engagement with the container rim 30b and to at least partially compress the gasket 41 therebetween for inhibiting leakage of the contents from the interior of the container 30. In the engaged position, the handles 16 and/or the elongated member 74 may be grasped by the hand of a user to allow the kitchen appliance 10 to be picked-up and/or transporting without the contents spilling or otherwise exiting from the interior of the container 30. In the disengaged position, the same portions of the elongated member 74 are preferably spaced-apart from slot or groove of each hook 72 to permit the lid 40 to be removed from the container rim 30b.

In use, the elongated member 74 is preferably placed in or moved to the disengaged position when the heating element 14 is activated and/or contents within the interior of the container 30 are heated. Otherwise, an undesirable build-up of pressure may occur within the interior of the container 30. Once the heating element 14 has been turned "off" and/or the contents within the interior 30a of the container 30 are sufficiently heated, the elongated member 74 is preferably placed on top of the lid 40 and rotated (e.g., counterclockwise) to the engaged position (FIG. 1) to generally lock and/or seal the lid 40 onto the container 30 and allow the kitchen appliance 10 to be lifted and/or transported. Once the kitchen appliance 10 has arrived at the desired location, the elongated member 74 is preferably moved or rotated (e.g., clockwise) to the disengaged position, at which time the heating element 14 may be activated to heat the contents of the container 30, or the lid 40 may be removed from the container 30 to provide access to the interior 30a of the container 30. The rotatable and locking/sealing features of the elongated member 74 eliminate the need for additional structure to be added to the kitchen appliance 10 to inhibit leakage of contents from the interior of the container 30. When not being used to place the lid 40 in the engaged position, the elongated member 74 may be removed from the lid 40 and used as a utensil to dispense or serve foodstuff.

Figure 2:
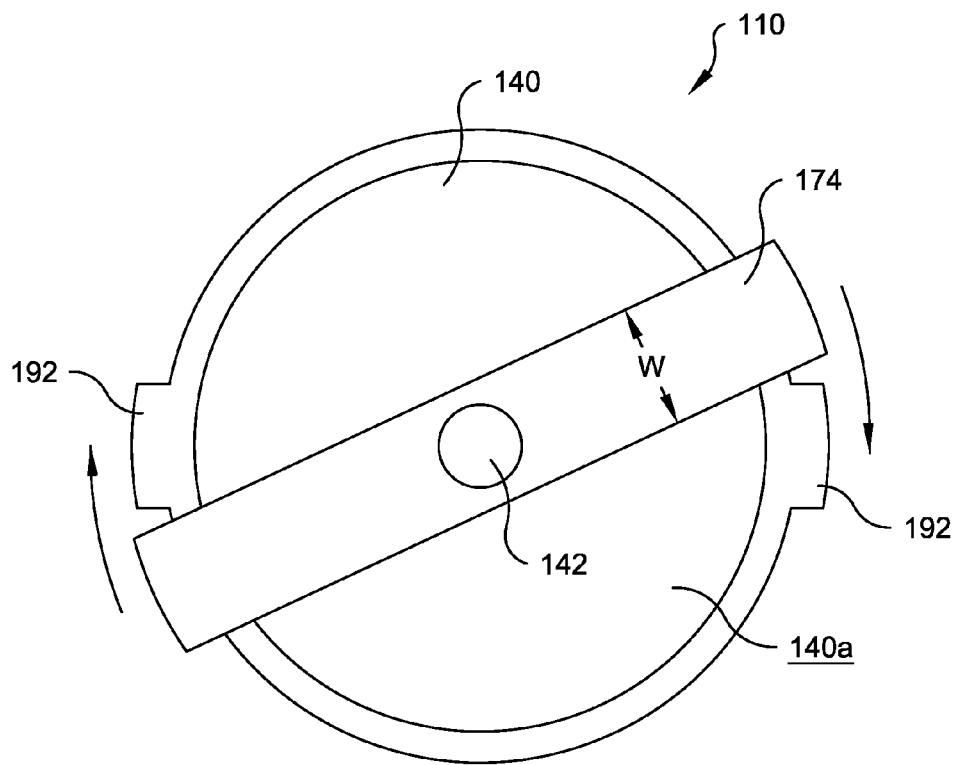
FIG. 2 is a top plan view of a kitchen appliance according to a second embodiment of the present disclosure, wherein the lid is in a disengaged position.
Figure 3:
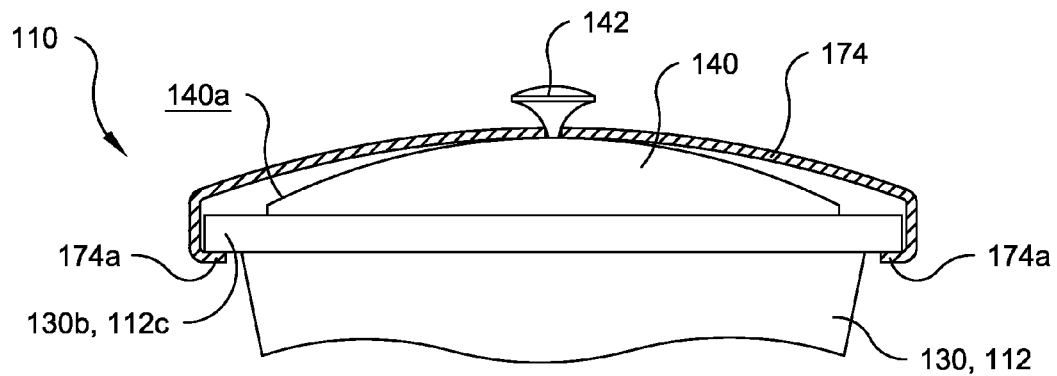
FIG. 3 is a partial cross-sectional side elevational view of the kitchen appliance of FIG. 2, wherein the lid is in the engaged position.

FIGS. 2 and 3 illustrate a second embodiment of the kitchen appliance 110. The reference numerals of the second embodiment are distinguishable from those of the first embodiment by a factor of one-hundred (100), but otherwise indicate the same elements as indicated in the first embodiment, except as otherwise specified. The kitchen appliance 110 of the second embodiment is substantially similar to that of the first embodiment. The description of certain similarities between the embodiments may be omitted herein for the sake of brevity and convenience, and, therefore, is not limiting.

A distinguishing feature of the second embodiment is that opposing end portions of the latching or elongated member 174 are sized and/or shaped to extend from the exterior surface 140a of the lid 140 to beneath a portion of the housing rim 112c and/or the container rim 130b. The elongated member 174 is preferably rotatable with respect to the lid knob 142, the lid 140, the container 130 and/or the housing 112. It is preferred that the elongated member 174 cannot be removed or otherwise separated from the lid knob 142 and/or the lid 140. The elongated member 174 is preferably rotatable (e.g., clockwise and/or counterclockwise) to put the lid 140 in the engaged position (FIG. 3) or the disengaged position (FIG. 2). As shown in FIG. 2, a width W of the elongated member 174 is preferably generally equal to a projection 192 of the container 130.

In use, the elongated member 174 is preferably rotated (e.g., clockwise) such that at least opposing portions or overhang portions 174a of the elongated member 174 surround at least a portion of the container 130 and/or the housing 112 to put the lid 140 in the engaged position (see FIG. 3). In particular, each overhang portion 174a preferably extends radially inwardly and engages at least an underside face of one of the projections 192. To place the lid 140 in the disengaged position (see FIG. 2), the elongated member 174 is preferably rotated in an opposite direction (i.e., counterclockwise) to move at least the opposing end portions of the elongated member 174 out of engagement with a portion of the container 130 and/or housing to allow the lid 140 to be removed from the container 130 and/or the housing.

Figure 4:
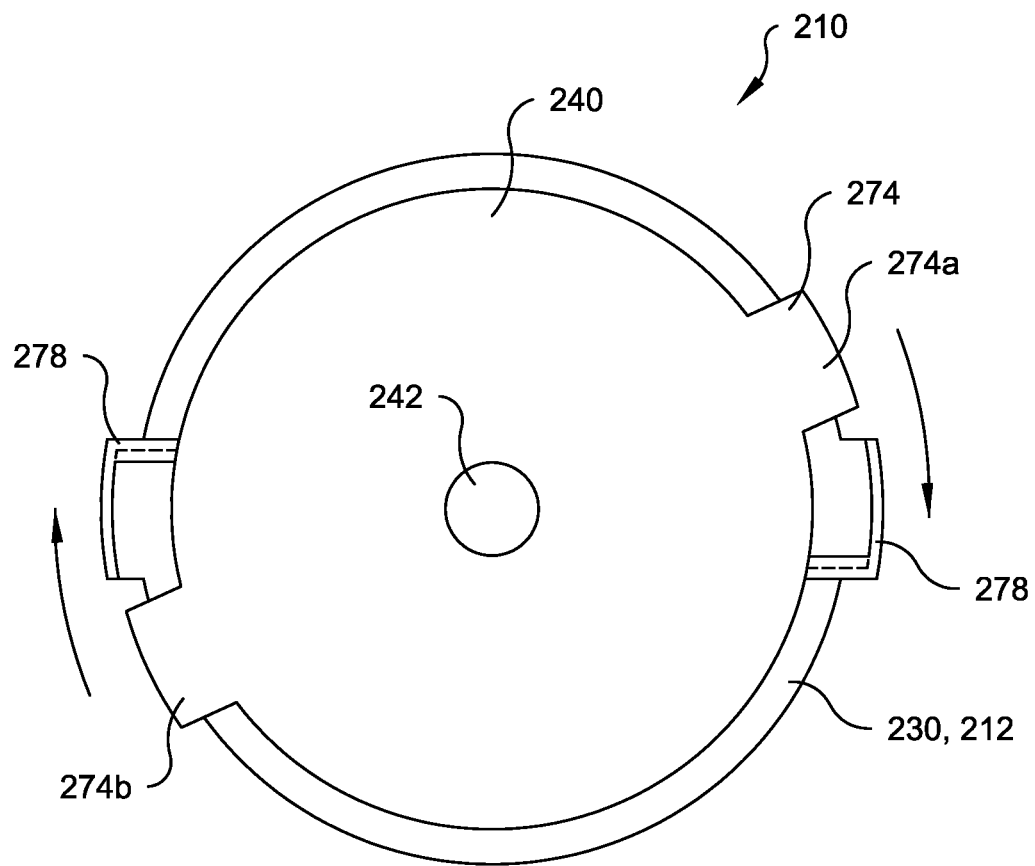
FIG. 4 is a top plan view of a kitchen appliance according to a third embodiment of the present disclosure, wherein the lid is in the disengaged position.

FIG. 4 illustrates a third embodiment of the kitchen appliance 210. The reference numerals of the third embodiment are distinguishable from those of the first embodiment by a factor of two-hundred (200), but otherwise indicate the same elements as indicated in the first embodiment, except as otherwise specified. The kitchen appliance 210 of the third embodiment is substantially similar to the first and second embodiments described above. The description of certain similarities between the embodiments may be omitted herein for the sake of brevity and convenience, and, therefore, is not limiting.

A distinguishing feature of the third embodiment is that the latching or elongated member 274 is essentially integrally, unitarily and/or monolithically formed with the lid 240. Stated differently, the elongated member 274 is preferably formed by at least one and more preferably two spaced-apart tabs 274a, 274b that extend laterally outwardly beyond the outer periphery of the lid 240. One of the container 230 and the housing 212 preferably include two spaced-apart receptacles 278. Each receptacle 278 is preferably sized and/or shaped to selectively receive and retain therein at least a portion of one of the tabs 274a, 274b. The receptacles 278 could be the same as or similar to the latches 70 of the first embodiment or could have some other shape or form if desired. It is preferred that the kitchen appliance 210 may have more tabs 274a, 274b and receptacles 278 as desired.

In use, the lid 240 is preferably rotated (e.g., clockwise) such that at least a portion of each tab 274a, 274b is positioned within at least a portion of one of the receptacles 278 to put the lid 240 in the engaged position. To place the lid 240 in the disengaged position (see FIG. 4), the lid 240 is preferably rotated in an opposite direction (i.e., counterclockwise) to move each tab 274a, 274b out of the respective receptacle 278 and allow the lid 240 to be removed from the container 230 and/or the housing 212.

FIGS. 5 and 5A illustrate a fourth embodiment of the kitchen appliance 310. The reference numerals of the fourth embodiment are distinguishable from those of the first embodiment by a factor of three-hundred (300), but otherwise indicate the same elements as indicated in the first embodiment, except as otherwise specified. At least certain portions of the kitchen appliance 310 of the fourth embodiment, such as the housing 312 having the handles 316 and the control knob 324, the container 330 and the lid 340, are substantially similar to that of the first through third embodiments described above. The description of certain similarities between the embodiments may be omitted herein for the sake of brevity and convenience, and, therefore, is not limiting.

A distinguishing feature of the fourth embodiment is that a vacuum seal can be used to seal foodstuff within the container 330 for transport of the kitchen appliance 310 without separate tools, latches or levers, for example. As shown in FIG. 5, the lid 340 preferably includes a valve 380 thereon and/or therein. The valve 380 is preferably spaced laterally inwardly from an outer periphery of the lid 340. The valve 380 is preferably selectively opened, closed and/or otherwise adjusted to either prevent the passage of gas (i.e., air) therethrough or permit the passage of gas therethrough. The valve 380 allows a vacuum to be created, maintained and/or released between the interior of the container 330 and the lid 340 when the lid 340 is properly placed on the container rim 330b.

In use, as the kitchen appliance 310 cools after being heated and with the valve 340 in a closed position, the lid 340 is drawn downwardly toward the interior of the container 330 such that a vacuum is drawn on the lid 340. Alternatively or additionally, a separate tool may be attached to the valve 380 to draw a vacuum within the container 330. The vacuum preferably causes the lid 340 to move at least slightly downwardly toward the container 330 to at least slightly compress the gasket 341. At least slight compression of the gasket 341 preferably seals the lid 340 on the container 330 and thereby places the lid 340 in the engaged position. To release the vacuum and thereby place the lid 340 in the disengaged position, the valve 380 can be at least partially opened to release gas (i.e., air) from within the interior of the container 330 to thereby release the negative pressure (vacuum) and allow the lid 340 to be removed from the container rim 330b.

FIGS. 6-8 illustrate modified embodiments of the gasket 341a, 341b, 341c, respectively. The gaskets 341a, 341b, 341c have alternative sizes, shapes and/or configurations to offer alternative ways to seal the lid 340 to the container rim 330b. The gasket 341a shown in FIG. 6 preferably engages both a portion of the exterior surface 340a and the interior surface 340b of the lid 340. At least a portion of the gasket 341a preferably engages and/or contacts at least a portion of the container rim 330b when the lid 340 is fully and properly placed on the container 330. The gasket 341b shown in FIG. 7 preferably surrounds and/or is in flush contact with at least a portion the exterior surface 340a of the lid 340, the interior surface 340b of the lid 340 and a sidewall 340c therebetween. The gasket 341b preferably includes at least two spaced-apart and diverging tabs 379 in the shape of a sideways V. Each tab 379 preferably engages and/or contacts at least a portion of the container rim 330b when the lid 340 is fully and properly placed on the container 330 to create a seal. The gasket 341c shown in FIG. 8 preferably surrounds and/or is in flush contact with at least a portion of the exterior surface 340a of the lid 340, the interior surface 340b of the lid 340 and a sidewall 340c therebetween. The gasket 341b preferably includes at least three spaced-apart tabs 379 that can extend generally parallel to one another and each of which preferably engage and/or contact at least a portion of the container rim 330b when the lid 340 is fully and properly placed on the container 330.

Figure 9:
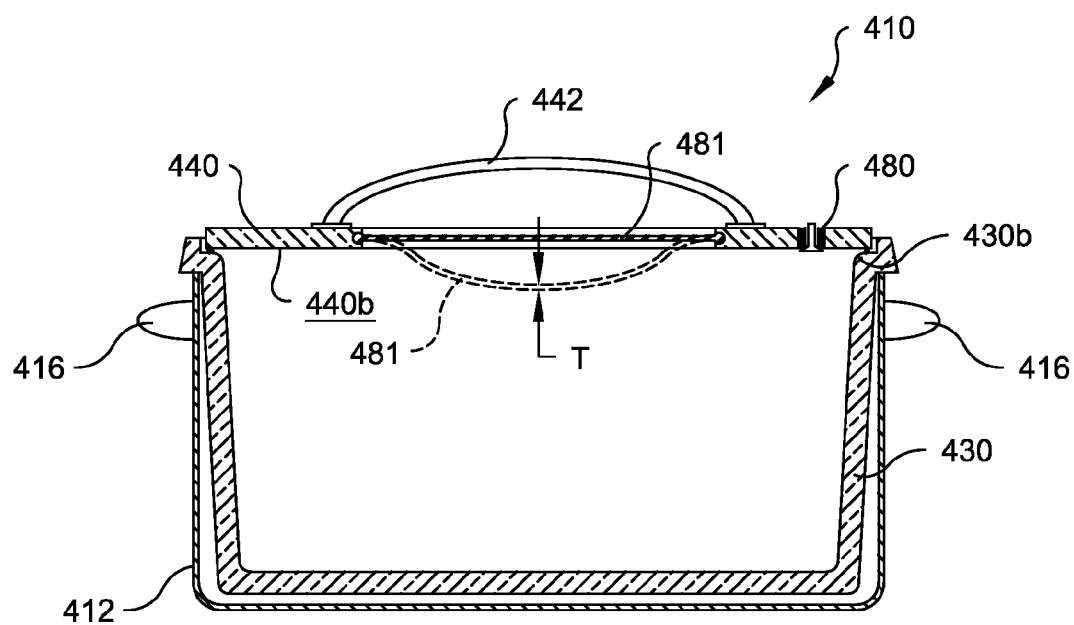
FIG. 9 is a cross-sectional side elevational view of a kitchen appliance according to a fifth embodiment of the present disclosure.
Figure 10:
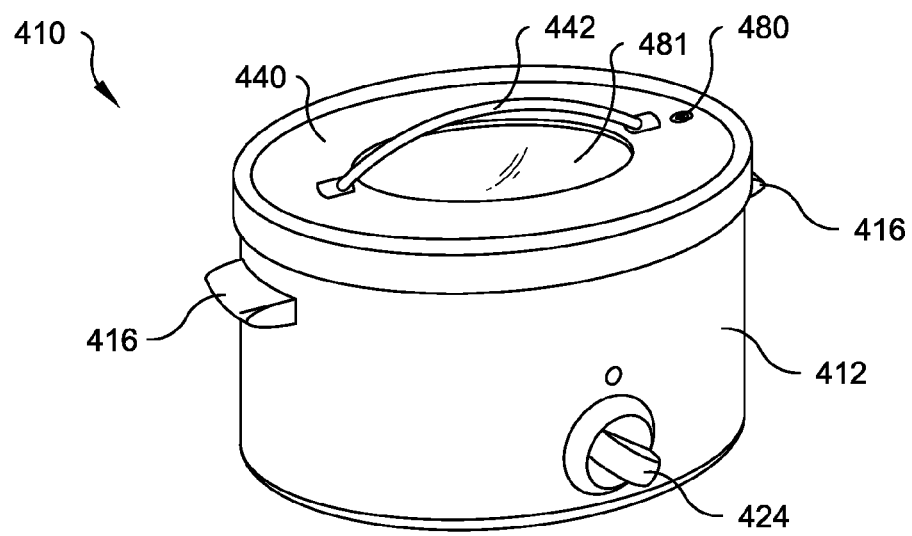
FIG. 10 is a top perspective view of the kitchen appliance of FIG. 9.

FIGS. 9 and 10 illustrate a fifth embodiment of the kitchen appliance 410. The reference numerals of the fifth embodiment are distinguishable from those of the first embodiment by a factor of four-hundred (400), but otherwise indicate the same elements as indicated in the first embodiment, except as otherwise specified. The kitchen appliance 410 of the fifth embodiment is substantially similar to that of the first and fourth embodiments described above. For example, the kitchen appliance 410 includes the housing 412 having the handles 416, the control knob 424 and the lid valve 480. The description of certain similarities between the embodiments may be omitted herein for the sake of brevity and convenience, and, therefore, is not limiting.

A distinguishing feature of the fifth embodiment is that the lid 440 includes at least one latching mechanism or flexible member 481. The flexible member 481 preferably has a thickness T (see FIG. 9) of approximately three millimeters. The flexible member 481 is preferably positioned in or at a geometric center of the lid 440 and is preferably formed of a clear polymeric material. However, the flexible member 481 is not limited to such a position and/or configuration. The flexible member 481 is preferably at least generally resilient and movable between a first position (see FIG. 10 and shown in broken lines in FIG. 9) and a second position (shown in solid lines in FIG. 9). In one sense, the flexible member 481 may operate similar to a plunger for a toilet. In the first position, at least a portion of the flexible member 481, and preferably a majority of the flexible member 481, is preferably positioned below the interior surface 440b of the lid 440 and extends into the container 430 when the lid 440 is properly placed on the container rim 430b. A lid handle 442 preferably extends over and/or across the flexible member 481. Opposing ends of the flexible member 481 are preferably fixedly attached to a generally rigid portion of the lid 440 that generally surrounds the flexible member 481. The lid valve 480 is preferably positioned within the generally rigid portion of the lid 440 that generally surrounds the flexible member 481.

In operation, the lid valve 480 may be selectively opened, closed and/or otherwise adjusted to either prevent the passage of gas (i.e., air) therethrough or permit the passage of gas therethrough. The valve 480 allows a vacuum to be created, maintained and/or released between the interior of the container 430 and the lid 440 when the lid 440 is properly placed on the container rim 430b. When the lid 440 is properly placed on the container rim 430b with the lid valve 480 in the closed position and a vacuum is created within the container 430, the flexible member 481 preferably moves or is otherwise placed in the first position. When the flexible member 481 is placed in the first position, the gasket 441 is preferably at least partially compressed between at least a portion of the lid 440 and at least a portion of the container rim 430b. When the vacuum is released by opening the lid valve 480, the flexible member 481 preferably moves or is otherwise placed in the second position, thereby placing the lid 440 in the disengaged position.

Figure 11:
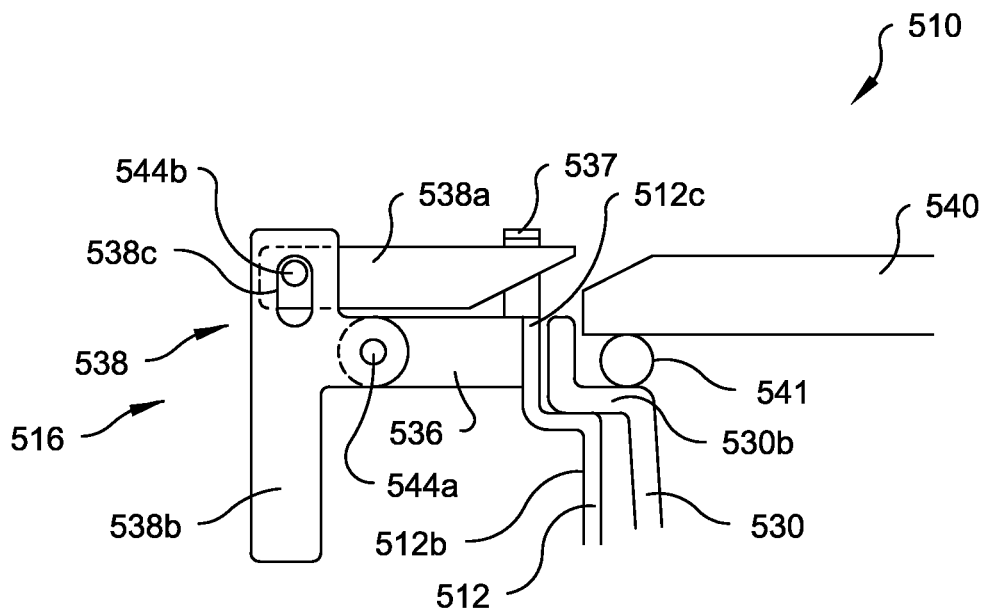
FIG. 11 is a partial side elevational view of a kitchen appliance according to a sixth embodiment of the present disclosure, wherein the lid is in the disengaged position.
Figure 12:
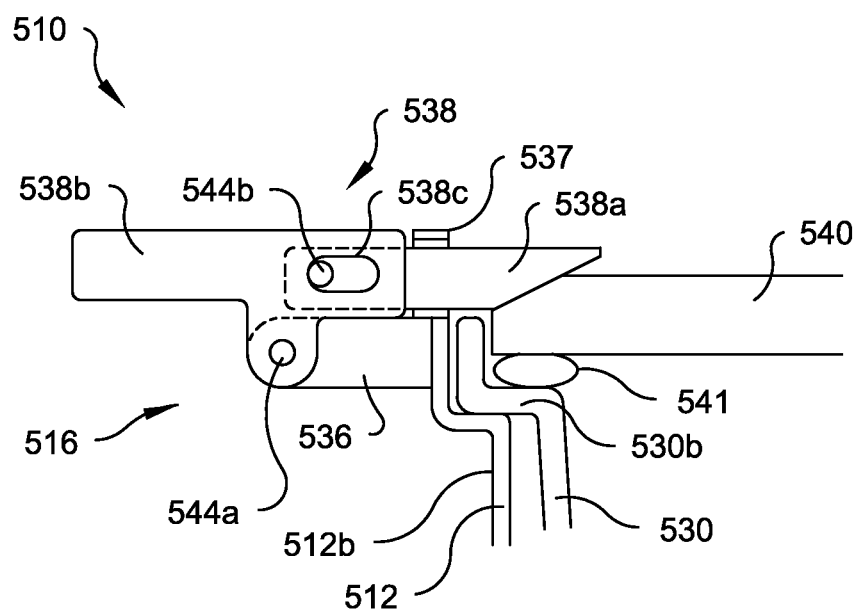
FIG. 12 is a partial side elevational view of the kitchen appliance of FIG. 11, wherein the lid is in the engaged position.

FIGS. 11 and 12 illustrate a sixth embodiment of the kitchen appliance 510. The reference numerals of the sixth embodiment are distinguishable from those of the first embodiment by a factor of five hundred (500), but otherwise indicate the same elements as indicated in the first embodiment, except as otherwise specified. At least certain portions of the kitchen appliance 510 of the sixth embodiment, such as the housing 512, the container 530, the lid 540 and the gasket 541, are substantially similar to that of the first embodiment described above. The description of certain similarities between the embodiments may be omitted herein for the sake of brevity and convenience, and, therefore, is not limiting.

A distinguishing feature of the sixth embodiment is that each handle 516 includes at least one and preferably two spaced-apart latching mechanisms. In particular, each handle 516 preferably includes a first segment 536, which is preferably fixedly attached to and extends outwardly and/or upwardly from one of the exterior surface 540a of the lid 540 and the exterior surface 513 of the side wall 512b of the housing 512. Each handle 516 also preferably includes a second segment 538, which is preferably pivotally attached to the first segment 536. The first segment 536 of each handle 516 is preferably fixed to the exterior surface 513 of the side wall 512b of the housing 512 at or just below the housing rim 512c. Alternatively, in an embodiment of the kitchen appliance 510 that does not include the housing 512, the first segment 536 may be fixed to an exterior surface of the container 530. A top surface of the first segment 536 is preferably coplanar with a top surface of the housing rim 512c. An opening (not shown) of each handle 516, which can be used to insert at least a portion of a user's hand therein to grab the handle 516, may be formed in at least one of the first and second segments 536, 538 thereof. A first pivot point 544a, such as a pin or dowel, preferably pivotally attaches the first segment 536 of each handle 516 to the second segment 538 thereof. The first pivot point 544a of each handle 516 is preferably positioned generally coplanar with the top surface of the housing rim 512c and the container rim 530b when the container 530 is placed within the housing 512. The second segment 538 is preferably pivotable with respect to the first segment 536 between a first position in which the second segment 538 maintains the lid 540 in the engaged position (see FIG. 12) and a second position in which the second segment 538 permits the lid 540 to be in the disengaged position (FIG. 11) such that the lid 540 is not in sealing engagement with the container rim 530b.

The second segment 538 preferably includes a first or inner portion 538a and a second or outer portion 538b. A second pivot point 544b, such as a pin or dowel, preferably pivotally attaches the first portion 538a of second segment 538 to the second portion 538b of the second segment 538. When the second segment 538 is in the first or engaged position (FIG. 12), the first portion 538a thereof preferably contacts and/or prevents the lid 540 from being removed from the container 530 and/or the housing 512. As shown in FIG. 11, a distal end of the first portion 538a of each second segment 538 may be sized, shaped and/or configured to conform or otherwise complement at least a portion of an outer edge of the lid 540. For example, the distal end of the first portion 538a may be tapered and/or include a recess therein.

In the second or disengaged position (FIG. 11), it is preferred that the entire first portion 538a of each second segment 538 is laterally spaced-apart from an outer periphery of the lid 540, so that the lid 540 may be removed from the container 530 and/or the housing 512. To move the first portion 538a of each second segment 538 between the first or engaged position (FIG. 12) and the second or disengaged position (FIG. 11), the second portion 538b thereof is preferably raised, lowered and/or rotated with respect to the first segment 536 and/or the housing 512/container 530. The second portion 538b of each second segment 538 preferably includes an elongated or ovular opening to receive at least a portion of a pin or dowel of the second pivot point 544b therein. It is preferred that a slot or archway 537 extends upwardly beyond the housing rim 512c to guide and/or contain the first portion 538a of the second segment 538 in both the first or engaged position (FIG. 12) and the second or disengaged position (FIG. 11).

When the kitchen appliance 510 is lifted from the support surface and/or transported, a user preferably grasps and/or raises at least the second portion 538a of the second segment 538 of each handle 516, which preferably causes the first portion 538a of each handle 516 to slide or otherwise move laterally inwardly toward a geometric center of the kitchen appliance 510. In such a position, at least a distal or inner end of the first portion 538a of the second segment 338 preferably directly contacts at least portion of the lid 540 and imparts a downward force on the lid 540. The downward force applied by the second segment 538 of each handle 516 preferably at least partially compresses the gasket 541, which preferably creates at least a generally liquid-tight seal between the lid 540 and the container 530 and/or the housing 512. When the kitchen appliance 510 is placed on the support surface, the second segment 538 may be pushed, rotated or otherwise moved (e.g., downwardly) to permit the lid 540 to be easily removed from the container 530 and/or the housing 512.

Figure 13:
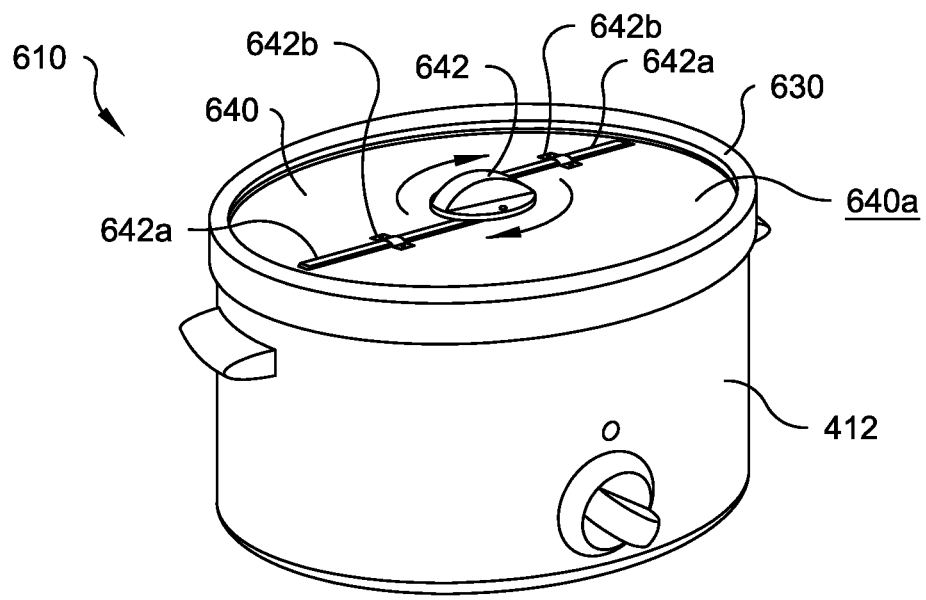
FIG. 13 is a top perspective view of a kitchen appliance according to a seventh embodiment of the present disclosure, wherein the lid is in the disengaged position.
Figure 14:
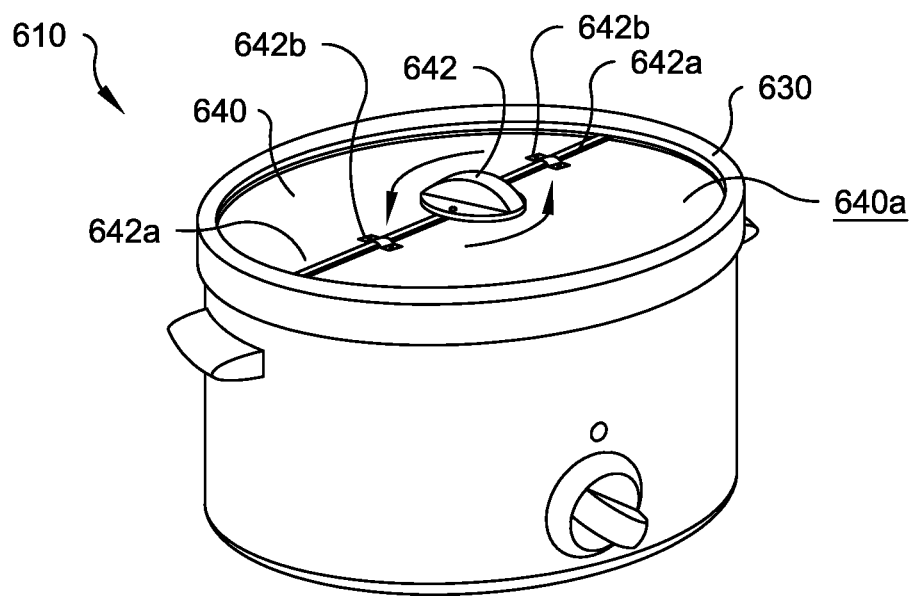
FIG. 14 is a top perspective view of the kitchen appliance of FIG. 13, wherein the lid is in the engaged position.

FIGS. 13 and 14 illustrate a seventh embodiment of the kitchen appliance 610. The reference numerals of the seventh embodiment are distinguishable from those of the first embodiment by a factor of six hundred (600), but otherwise indicate the same elements as indicated in the first embodiment, except as otherwise specified. At least portions of the kitchen appliance 610 of the sixth embodiment, such as the housing 612, the container 630 and the lid 640, are substantially similar to those of the first embodiment described above. The description of certain similarities between the embodiments may be omitted herein for the sake of brevity and convenience, and, therefore, is not limiting.

A distinguishing feature of the seventh embodiment is that the lid handle 642 includes at least one latching mechanism. In particular, the lid handle 642 is preferably rotatable with respect to the lid 640 and includes two spaced-apart and generally rigid locking members 642a that extend laterally outwardly therefrom. The lid handle 642 is preferably rotatable (i.e., clockwise and/or counterclockwise) between a first or engaged position (FIG. 14) and a second or disengaged position (FIG. 13). As the lid handle 642 is rotated, the locking members 642 preferably slide or otherwise move laterally inwardly and/or outwardly with respect to the lid 640. Two spaced-apart brackets 642b are preferably fixedly attached to the exterior surface 640a of the lid 640 and include an opening or passageway (not shown) therebetween to permit passage of one of the locking members 642a therethrough. Each bracket 642b preferably maintains and/or assures proper alignment and/or positioning of one of the locking members 642a.

In the first or engaged position (FIG. 14), at least a portion of each locking member 642a engages at least a portion of one of the container 630 and/or the housing 612 such that the locking members 642a and the lid handle 642 combine to extend generally across the entire diameter of the lid 640. In particular, one of the container 620 and/or the housing 612 may include two spaced apart slots or recesses (none shown) proximate an upper rim or periphery thereof that are sized, shaped and/or configured to receive at least a portion of one of the locking member 642a when the lid handle 642 is in the first or engaged position (FIG. 14). In the first or engaged position (FIG. 14) of the lid handle 642, the gasket (not shown) is preferably at least partially compressed between the lid 640 and at least a portion of the container 630 so that the kitchen appliance 610 can be lifted and/or transported without foodstuff within the container 630 leaking outside of the kitchen appliance 610.

Figure 15:
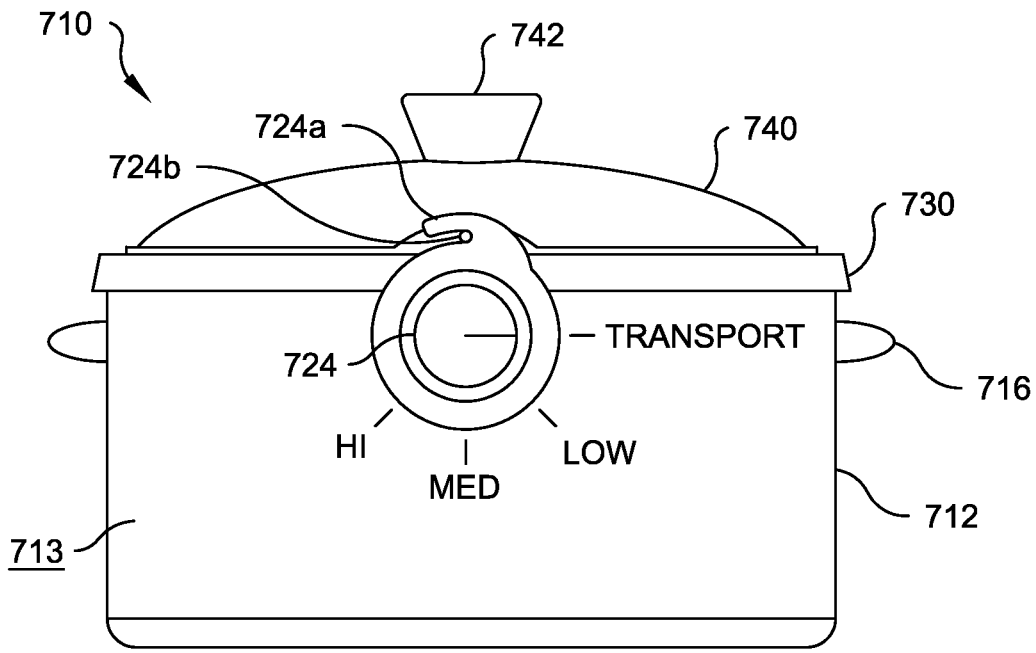
FIG. 15 is a front elevational view of a kitchen appliance according to an eighth embodiment of the present disclosure, wherein the lid is in the engaged position.
Figure 16:
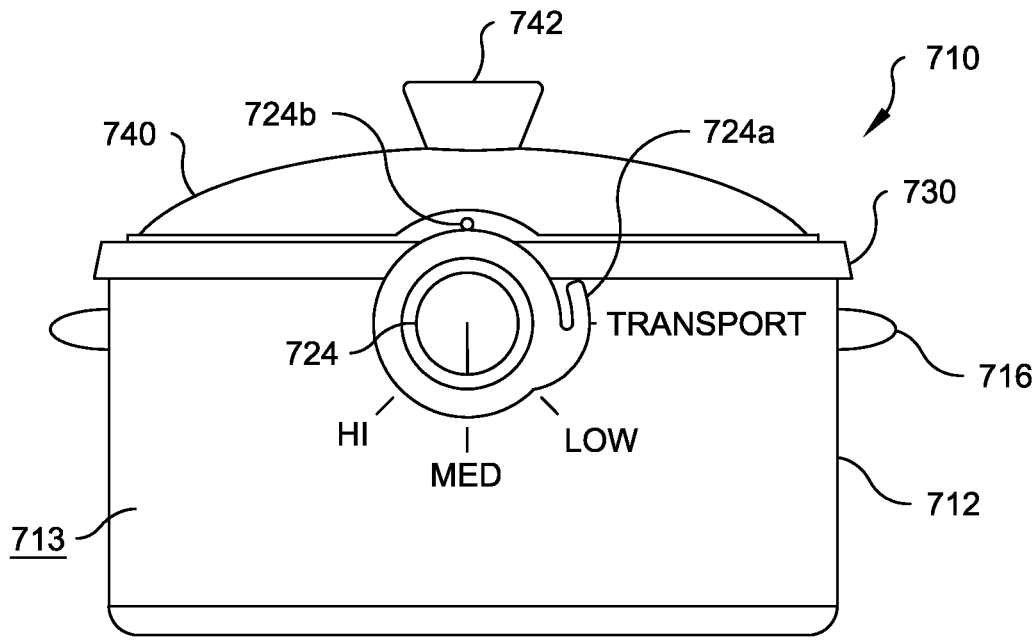
FIG. 16 is a front elevational view of the kitchen appliance of FIG. 15, wherein the lid is in the disengaged position.

FIGS. 15 and 16 illustrate an eighth embodiment of the kitchen appliance 710. The reference numerals of the eighth embodiment are distinguishable from those of the first embodiment by a factor of seven hundred (700), but otherwise indicate the same elements as indicated in the first embodiment, except as otherwise specified. At least portions of the kitchen appliance 710 of the eighth embodiment, such as the housing 712, the handle 716, the container 730, the lid 740 and the lid handle 742, are substantially similar to those of the first embodiment described above. The description of certain similarities between the embodiments may be omitted herein for the sake of brevity and convenience, and, therefore, is not limiting.

A distinguishing feature of the kitchen appliance 710 of the eighth embodiment is that the control knob 724 includes at least one latching mechanism. In particular, the control knob 724 preferably includes a hook or latch 724a. The latch 724a preferably extends outwardly from the control knob 724 and is preferably fixedly attached thereto, such that rotation of the control knob 724 rotates the latch 724a. The latch 724a is preferably sized, shaped and/or configured to at least partially surround and/or engaged a pin or similar member 724b that preferably extends outwardly from at least a portion of the lid 740.

The control knob 724 is preferably rotatable (e.g., clockwise and/or counterclockwise) between any one of at least four separate and distinct positions. For example, when the control knob 724 is rotated counterclockwise to an extreme position, at least a portion of the latch 724a preferably engages at least a portion of the pin 724b, thereby maintaining the lid 740 in contact with the container 730 and/or the housing 712 and at least partially compressing the gasket (not shown) therebetween). Such a position may be referred to as a first or engaged position (see FIG. 15). The control knob 724 may be rotated clockwise to one of at least three separate and distinct cooking positions (e.g., high, medium and low). In the cooking positions (see FIG. 16, for example), the latch 724a is preferably spaced-apart from the lid 740, thereby permitting the lid 740 to be removed from the container 730 and/or the housing 712. As shown in FIGS. 15 and 16, indicia, such as "HI," "MED," "LOW" and "TRNASPORT" may be included on the exterior surface 713 of the housing 712 to indicate to a user the position of the control knob 724 and/or the operating mode of the kitchen appliance 710. In addition, if desired, a similar knob (not shown), which includes a similar latch 724a, could be located on an opposite side of the kitchen appliance 710 to secure the lid 740 to the container 730 and/or the housing 712.

Figure 17:
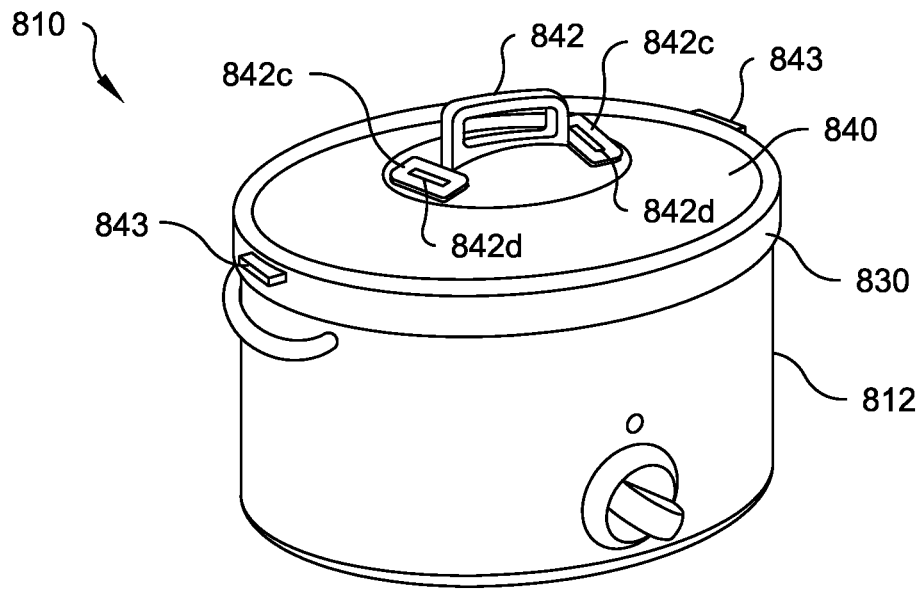
FIG. 17 is a top perspective view of a kitchen appliance according to a ninth embodiment of the present disclosure, wherein the lid is in the disengaged position.
Figure 18:
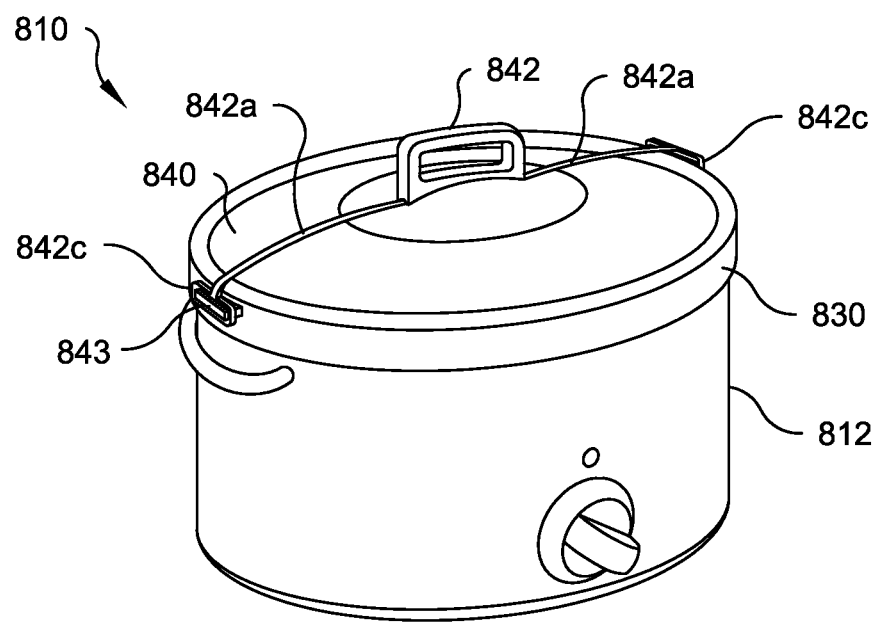
FIG. 18 is a top perspective view of the kitchen appliance of FIG. 17, wherein the lid is in the engaged position.

FIGS. 17 and 18 illustrate a ninth embodiment of the kitchen appliance 810. The reference numerals of the ninth embodiment are distinguishable from those of the first embodiment by a factor of eight hundred (800), but otherwise indicate the same elements as indicated in the first embodiment, except as otherwise specified. At least portions of the kitchen appliance 810 of the ninth embodiment, such as the housing 812, the container 830 and the lid 840, are substantially similar to those of the first and eight embodiments described above. The description of certain similarities between the embodiments may be omitted herein for the sake of brevity and convenience, and, therefore, is not limiting.

A distinguishing feature of the kitchen appliance 810 of the ninth embodiment is the inclusion of two spaced-apart and generally flexible locking members 842a. Each locking member 842a is preferably movable between a first or engaged position (see FIG. 18) in which the locking member 842a extends laterally outwardly from the lid handle 842 and a second or disengaged position (see FIG. 17) in which preferably substantially the entire locking members 842a are positioned generally within the lid handle 842. Each locking member 842a is preferably biased (e.g., recoil) in the disengaged position (see FIG. 17). Each locking member 842a preferably includes a latch 842c on an end opposite the end attached and/or positioned within the lid handle 842.

The container 830 and/or the housing 812 preferably includes two spaced-apart projections 843 that extend laterally outwardly therefrom. Each projection 843 is preferably sized, shaped and/or configured to be inserted into at least a portion of one of the latches 842c. Each latch 842c preferably includes a slot or passageway 842d (see FIG. 17) therein that is preferably at least slightly larger and complementary to one of the projections 843 to receive and retain at least a portion of one of the projections 843 therein. In the first position (see FIG. 18), each locking member 842a preferably engages one of the projections 843, thereby locking or otherwise securing the lid 840 to the container 830 and/or the housing 812 and preferably at least partially compressing the gasket (not shown) therebetween. In the second position (see FIG. 17), the latch 842c of each locking member 842a is preferably spaced-apart from the projections 843 such that each locking member 842a is substantially positioned within the lid handle 842 so that the lid 840 may be easily removed from the container 830 and/or the housing 812. Similar to any other structure described with respect to this or another embodiment of the present disclosure, the positioning of the latches 842c and the projections 843 may be reversed, such that the latches 842c form a protrusion or projection that may be received in a groove or slot of the container 830 and/or the housing 812.

Figure 19:
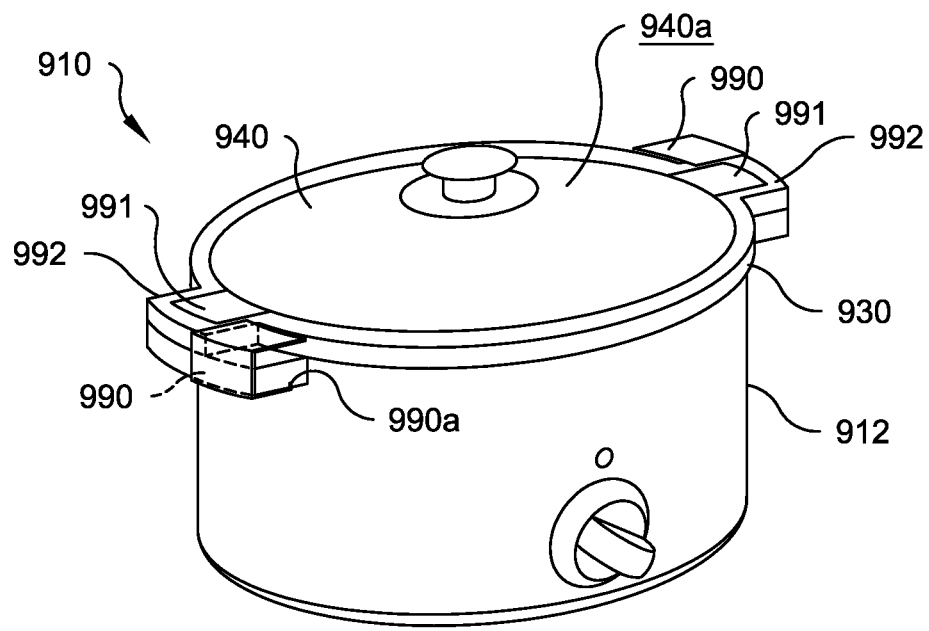
FIG. 19 is a top perspective view of a kitchen appliance according to a tenth embodiment of the present disclosure, wherein the lid is in the disengaged position.
Figure 20:
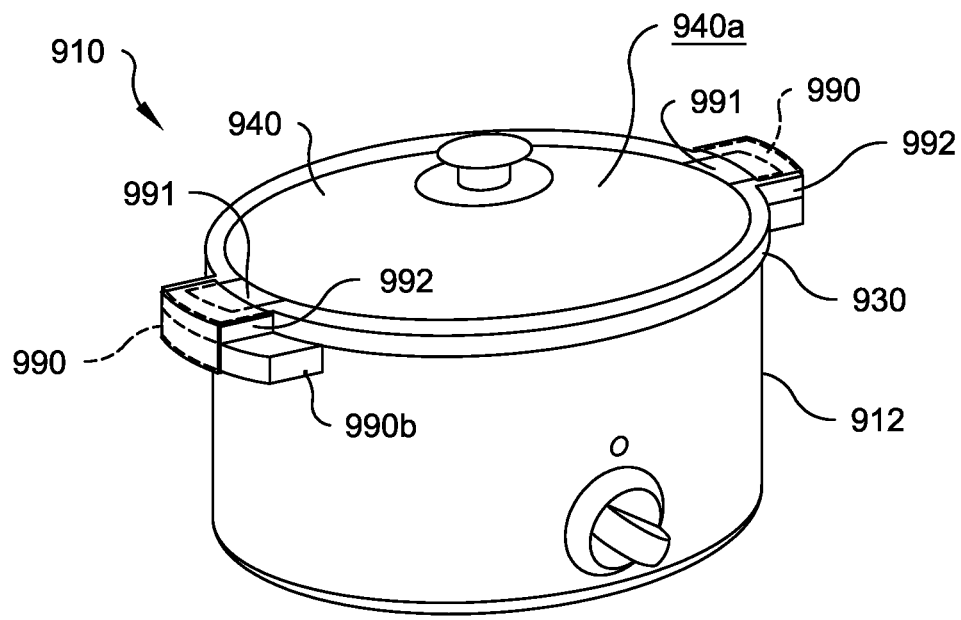
FIG. 20 is a top perspective view of the kitchen appliance of FIG. 19, wherein the lid is in the engaged position.

FIGS. 19 and 20 illustrate a tenth embodiment of the kitchen appliance 910. The reference numerals of the tenth embodiment are distinguishable from those of the first embodiment by a factor of nine hundred (900), but otherwise indicate the same elements as indicated in the first embodiment, except as otherwise specified. At least portions of the kitchen appliance 910 of the tenth embodiment, such as the housing 912, the container 930 and the lid 940, are substantially similar to those of the first embodiment described above. The description of certain similarities between the embodiments may be omitted herein for the sake of brevity and convenience, and, therefore, is not limiting.

The kitchen appliance 910 of the tenth embodiment preferably includes at least two latching mechanisms or slide clips 990, which preferably either i) retain the lid 940 on the container 930 and/or the housing 912 or ii) permit the lid 940 to be removed from the container 930 and/or the housing 912. Each slide clip 990 may be completely removable (i.e., separable) from the lid 940, the container 930 and/or the housing 912. Each slide clip 990 is preferably "C" or "U" shaped and is capable of extending from at least a portion of the handle 916 of the housing 912 to a portion of the exterior surface 940a of the lid 940. The slide clips 990 preferably have a low profile, thereby allowing the kitchen appliance 910 to be generally compact for storage and/or transporting purposes. Each slide clip 990 is preferably slidable in a generally horizontal direction, as opposed to a vertical direction.

More specifically, the lid 940 preferably includes two spaced-apart projections 991 that extend laterally outwardly beyond an outer peripheral rim thereof. Each projection 991 is preferably sized, shaped and/or configured to fit within a complementary groove formed in a projection 992 that extends laterally outwardly beyond an outer periphery of the container 930. When the container 930 is preferably positioned within the housing 912, each projection 992 of the container 930 is preferably position directly vertically above at least a portion of one of the handles 916 of the housing 912. It is preferred that each slide clip 990 includes a tab 990a (see FIG. 19) that is sized, shaped, and/or configured to engage or fit within a slot 990b on a lower or bottom surface of one of the handles 916, so as to maintain the slide clip 990 in the proper position and/or orientation.

In operation, each slide clip 990 is preferably slidable or otherwise movable between a first or engaged position (FIG. 20) and a second or disengaged position (FIG. 19). The second position is preferably laterally and/or circumferentially spaced-apart from the first position. In the first position (see FIG. 20), each slide clip 990 preferably surrounds at least a portion of one of the handles 916, one of the projections 992 of the container 930 and one of the projections 991 of the lid 940, such that the slide clips 990 combine to lock or otherwise secure the lid 940 to the container 930 and/or the housing 912 and preferably at least partially compress the gasket (not shown) therebetween. In the second position (see FIG. 19), each slide clip 990 is preferably at least slightly spaced-apart from the projections 991 of the lid 940 so that the lid 940 may be easily removed from the container 930 and/or the housing 912. In the second position (see FIG. 19), at least a portion of each slide clip 990 may continue to surround and/or engage at least a portion of one of the projections 992 of the container 930.

Figure 21:
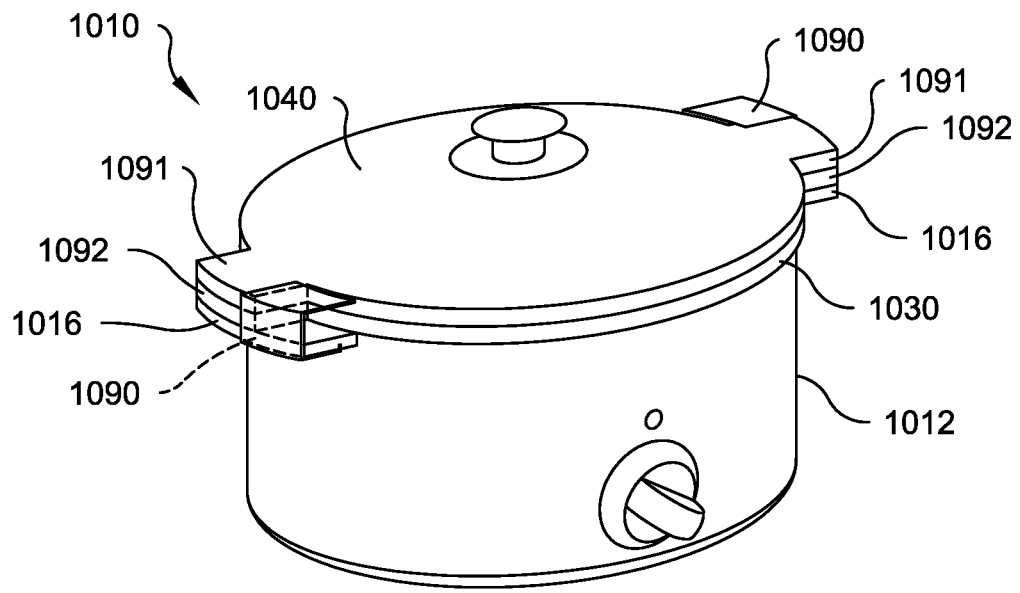
FIG. 21 is a top perspective view of a kitchen appliance according to an eleventh embodiment of the present disclosure, wherein the lid is in the disengaged position.
Figure 22:
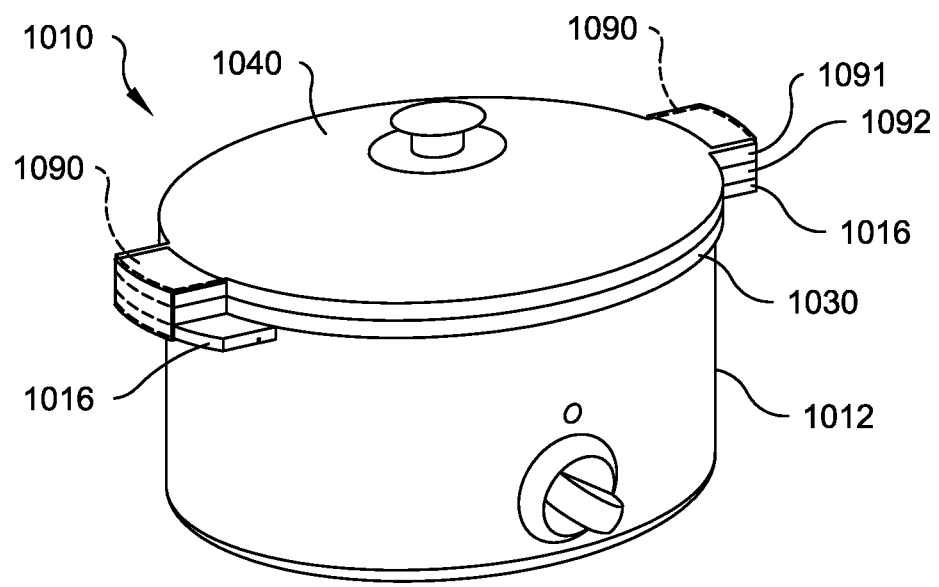
FIG. 22 is a top perspective view of the kitchen appliance of FIG. 21, wherein the lid is in the engaged position.

FIGS. 21 and 22 illustrate an eleventh embodiment of the kitchen appliance 1010. The reference numerals of the eleventh embodiment are distinguishable from those of the first embodiment by a factor of one thousand (1000), but otherwise indicate the same elements as indicated in the first embodiment, except as otherwise specified. At least portions of the kitchen appliance 1010 of the eleventh embodiment, such as the housing 1012 with handles 1016, the container 1030 with projections 1092, the lid 1040 and the slide clips 1090, are substantially similar to those of the first and tenth embodiments described above. The description of certain similarities between the embodiments may be omitted herein for the sake of brevity and convenience, and, therefore, is not limiting.

As compared to the tenth embodiment described in detail above, a distinguishing feature of the eleventh embodiment of the kitchen appliance 1010 is that the projections 1091 of the lid 1040 preferably have the same size, shape and/or configuration as the projections 1092 of the container 1092. In addition, the projections 1092 of the container 1030 do not include a groove that receives the projections 1091 of the lid 1040. Instead, each projection 1091 of the lid 1040 preferably rests and/or is positioned directly above one of the projections 1092 of the container 1030 when the lid 1040 is properly positioned on the container 1030. Operation of the slid clips 1090 generally function as described above for the tenth embodiment and further description herein is not warranted.

It will be appreciated by those skilled in the art that changes could be made to the embodiments described above without departing from the broad inventive concept thereof. For example, the position of any structure identified above may be modified or placed on a different base structure. Also, any structure identified above as being located or positioned on the housing or the container of the kitchen appliance may be located or positioned on the lid of the kitchen appliance, assuming other corresponding changes are made to the kitchen appliance. It is understood, therefore, that this disclosure is not limited to the particular embodiments disclosed, but it is intended to cover modifications within the spirit and scope of the present disclosure.

We claim:

1. An appliance, comprising:
    a kitchen appliance with a housing having a base and a side wall extending therefrom, the side wall having an exterior surface and an opposing interior surface, at least portions of the interior surface of the side wall and base defining a cavity within the housing, the housing having a housing rim at a first, free edge of the side wall defining an opening to the cavity;
    a heating element disposed within the housing proximate the cavity to heat the cavity;
    a container having a generally hollow interior and a container rim defining an opening for accessing the interior thereof, the interior being capable of retaining contents therein, the container being sized and shaped to fit within the cavity of the housing, first and second projections extending radially outwardly from the container rim beyond the housing and being positioned generally diametrically opposed on the container rim;
    a lid sized and shaped to at least partially cover the opening of the container when placed on the container, the lid having an exterior surface, an opposing interior surface facing the interior of the container when the lid is placed on the container, and a lid knob extending outwardly or upwardly from the exterior surface of the lid and including an upper gripping handle; and
    an elongated latching member having a middle portion that extends at least over the width of the lid and the width of the container, the middle portion including an opening generally centrally located with respect to the exterior surface of the lid, a portion of the lid knob extending through the opening into engagement with the lid such that the latching member is rotatably mounted on the lid, and opposing first and second generally L-shaped end portions that extend from opposite ends of the middle portion downwardly and radially inwardly, the latching member being rotatable about a vertical axis defined from the lid knob to a bottom of the appliance to an engaged position wherein the generally L-shaped end portions extend around and beneath the first and second projections into engagement with an underside thereof, respectively, to releasably interlock the lid to the container, the latching member being rotatable about a vertical axis defined from the lid knob to a bottom of the appliance to a disengaged position wherein the first and second generally L-shaped end portions are spaced from the first and second projections to permit removal of the lid from the container.

2. The appliance of claim 1, wherein the opening has an internal diameter at least slightly larger than an external diameter of the portion of the lid knob extending through the opening enabling the latching member to rotate with respect to at least one of the lid knob, the lid, the container and the housing.

3. The appliance of claim 1, wherein the lid, first and second projections and first and second L-shaped end portions are dimensioned such that with the latching member in the engaged position the lid is retained in sealing engagement with the container rim for inhibiting leakage of the contents from the interior of the container.

4. The appliance of claim 1, wherein the elongated member is inseparably mounted to the lid and the lid knob.

5. The appliance according to claim 1, further comprising a flexible gasket positioned between the lid and container, the gasket being at least partially compressed when the latching member is in the engaged position.

6. The appliance of claim 1, wherein the first and second projections have a projection width, a width of the L-shaped end portions being generally equal to the projection width.

* * * * *